(12) United States Patent
Edwards

(10) Patent No.: US 8,941,600 B2
(45) Date of Patent: Jan. 27, 2015

(54) APPARATUS FOR PROVIDING TOUCH FEEDBACK FOR USER INPUT TO A TOUCH SENSITIVE SURFACE

(75) Inventor: Cliff Edwards, Delta (CA)

(73) Assignee: McKesson Financial Holdings, Hamilton (BM)

( * ) Notice: Subject to any disclaimer, the term of this patent is extended or adjusted under 35 U.S.C. 154(b) by 270 days.

(21) Appl. No.: 13/034,008

(22) Filed: Feb. 24, 2011

(65) Prior Publication Data

US 2011/0215914 A1    Sep. 8, 2011

Related U.S. Application Data

(63) Continuation-in-part of application No. 12/718,717, filed on Mar. 5, 2010.

(51) Int. Cl.
G06F 3/041 (2006.01)
G08B 6/00 (2006.01)

(52) U.S. Cl.
CPC . G06F 3/041 (2013.01); G08B 6/00 (2013.01)
USPC ........................ 345/173; 340/407.2

(58) Field of Classification Search
CPC .. G06F 2203/041; G06F 3/016; F09B 21/003
USPC ........................ 340/407.2; 345/173
See application file for complete search history.

(56) References Cited

U.S. PATENT DOCUMENTS

| | | | |
|---|---|---|---|
| 5,943,044 A * | 8/1999 | Martinelli et al. | 345/174 |
| 5,988,902 A * | 11/1999 | Holehan | 400/479.1 |
| 6,262,717 B1 | 7/2001 | Donohue et al. | |
| 7,146,577 B2 * | 12/2006 | Hoffman | 715/865 |
| 2002/0097229 A1 * | 7/2002 | Rose et al. | 345/173 |
| 2003/0029372 A1 * | 2/2003 | Moore | 116/205 |
| 2003/0058265 A1 * | 3/2003 | Robinson et al. | 345/701 |
| 2005/0151720 A1 * | 7/2005 | Cruz-Hernandez et al. | 345/156 |
| 2006/0256090 A1 * | 11/2006 | Huppi | 345/173 |
| 2007/0013677 A1 * | 1/2007 | Rosenberg et al. | 345/173 |
| 2007/0070052 A1 | 3/2007 | Westerman et al. | |
| 2007/0229465 A1 * | 10/2007 | Sakai et al. | 345/173 |
| 2008/0129705 A1 * | 6/2008 | Kim et al. | 345/174 |
| 2008/0165141 A1 * | 7/2008 | Christie | 345/173 |
| 2009/0217164 A1 | 8/2009 | Beitle et al. | |
| 2009/0295737 A1 | 12/2009 | Goldsmith et al. | |

OTHER PUBLICATIONS

Omniglot, www.omniglot.com/writingbraille.htm, Mar. 19, 2006.*

(Continued)

Primary Examiner — Andrew Sasinowski
Assistant Examiner — Mihir Rayan
(74) Attorney, Agent, or Firm — Alston & Bird LLP

(57) ABSTRACT

An apparatus is provided that includes a graphic overlay or display for a touch-sensitive surface with which an object comes into contact. The touch-sensitive surface is divided into a plurality of regions each of a number of which is associated with a distinct set of one or more of the plurality of gestures, where the plurality of gestures are associated with a respective plurality of functions of a software application operable by a processor. According to this aspect, the graphic overlay or display visibly depicts the regions and a layout of the regions into which the touch-sensitive surface is divided. The apparatus may further include a touch-feedback interface configured to provide touch feedback indicative of the gesture associated with the respective region within which the touch-feedback interface is disposed.

12 Claims, 12 Drawing Sheets

(56) References Cited

OTHER PUBLICATIONS

Malte Weiss, et al.; *SLAP Widgets: Bridging the Gap Between Virtual and Physical Controls on Tabletops*; CHI 2009: Proceedings of the 27th Annual SIGCHI Conference on Human Factors in Computing Systems; Apr. 3-9, 2009; ACM 978-1-60558-246-7/07/0004 (10 pgs.).

Malte Weiss, et al.; *SLAP Widgets: Bridging the Gap Between Virtual and Physical Controls on Tabletops*; CHI 2009: Extended Abstracts on Human Factors in Computing Systems; Apr. 4-9, 2009; ACM 978-1-60558-247-Apr. 9, 2004 (6 pgs.).

Malte Weiss, et al.; *SLAPbook: Tangible Widgets on Multi-touch Tables in Groupware Environments*; TEI 2009: Proceedings of the 3rd International Conference on Tangible and Embedded Interaction; pp. 1-4.

Malte Weiss, et al.; *SLAP: Silicone Illuminated Active Peripherals*; Extended Abstracts of Tabletop 2008.

Wayne Westerman; *Hand Tracking, Finger Identification, and Chordic Manipulation on a Multi-Touch Surface*; Dissertation submitted to the University of Delaware; Spring 1999 (363 pgs.).

United States Office Action for U.S. Appl. No. 12/718,717, dated Jul. 3, 2013.

\* cited by examiner

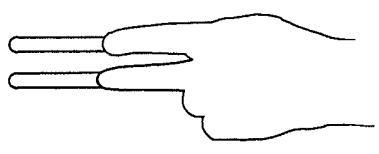
FIG. 14d
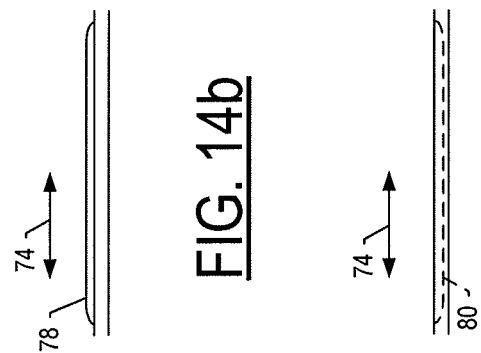
FIG. 14b
FIG. 14c
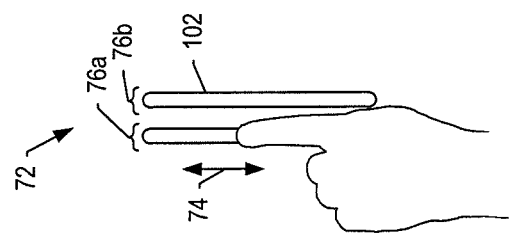
FIG. 14a

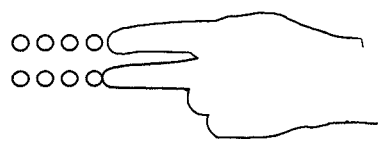
FIG. 15d
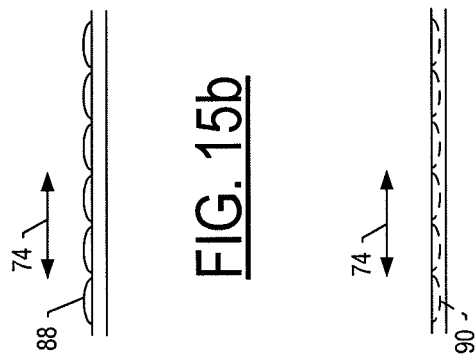
FIG. 15b
FIG. 15c
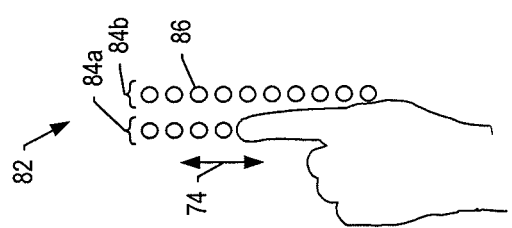
FIG. 15a

APPARATUS FOR PROVIDING TOUCH FEEDBACK FOR USER INPUT TO A TOUCH SENSITIVE SURFACE

CROSS-REFERENCE TO RELATED APPLICATIONS

The present application is a continuation-in-part of U.S. patent application Ser. No. 12/718,717, entitled: Apparatus and Method for Directing Operation of a Software Application Via a Touch-Sensitive Surface Divided into Regions Associated with Respective Functions, filed Mar. 5, 2010, the content of which is hereby incorporated by reference in its entirety.

FIELD OF THE INVENTION

The present invention generally relates to a user interface and methods for interacting with a computer system, and more particularly, to a touch-based user interface and method for interacting with a medical-imaging system.

BACKGROUND OF THE INVENTION

In the field of medical imaging, prior to the digitization of medical imaging, medical-imaging users (e.g., Radiologists) would analyze physical film printed images in light boxes, and use physical devices such as magnifying glasses, rulers, grease pencils, and their hands to manipulate the physical printed medical images in order to interpret and diagnose the images. With the digitization of medical imaging, the physical film became a digital image, displayable on a computer monitor. A medical-imaging system became a computer application or collection of computer applications, which require a computer or computers to operate. At present, medical-imaging systems are interacted with through a mouse and keyboard. Commands to the medical-imaging system are typically invoked through mouse and/or keyboard interactions.

For image-intensive computing with rich graphical user interfaces, the mouse is showing its age. The mouse constrains the interaction to a single x, y point on the display with buttons to make selections and initiate modes of operation, such as click and drag. Most modern computer mice also have a special purpose scroll mechanism, often a wheel. Much of the human hand and finger capabilities and dexterity are not utilized with a mouse, and a mouse is limited to only one hand. Using the mouse for long periods of time tends to cause fatigue and repetitive stress symptoms due to the need to grasp the device and repeatedly perform small stressing motions of the fingers to click buttons.

For alphanumeric text entry, and initiating commands, keyboards have remained much the same for many decades and it has been difficult to find alternatives that perform better at text entry, for most users. When used as an input device for medical-imaging systems, some form of keyboard may remain in use for text entry for a long time to come. However, another common purpose for which keyboards are used with medical-imaging systems is for shortcuts to operations generally also available with the mouse but at the cost of navigation time and additional mouse clicking. The trade-off with mapping functions to keyboard shortcuts is the user has to learn and remember non-intuitive mappings of functions to keys, and most people have trouble remembering more than a few. In some cases, shortcuts to operations are also mapped to mouse modes of operation, often in conjunction with the keyboard. For example, a medical-imaging system zoom-image function could be mapped to the combination of holding down the Ctrl key and moving the mouse forward and back or rolling the scroll wheel. A better alternative to keyboard and mouse shortcuts for triggering medical-imaging system operations must make this mapping highly visible to reduce cognitive load, as well as make the interaction easy to reach quickly for efficiency.

SUMMARY OF THE INVENTION

In light of the foregoing background, exemplary embodiments of the present invention provide an improved apparatus for more intuitively and efficiently interacting with a computer system, such as a medical-imaging system. According to one aspect of exemplary embodiments of the present invention, an apparatus is provided that includes a graphic overlay for a touch-sensitive surface with which an object comes into contact. The touch-sensitive surface is divided into a plurality of regions each of a number of which is associated with a distinct set of one or more of the plurality of gestures, where the plurality of gestures are associated with a respective plurality of functions of a software application operable by a processor. According to this aspect, the graphic overlay visibly depicts the regions and a layout of the regions into which the touch-sensitive surface is divided. The graphic overlay may also include a set of one or more uniquely-placed contacts that, when the overlay is placed on the touch-sensitive surface, are detectable by the touch-sensitive surface and interpretable to correspond to the regions and the layout of the regions.

The apparatus may further include a touch-feedback interface disposed on the graphic overlay within a region depicted by the graphic overlay. In such instances, the touch-feedback interface may include a structure shaped to provide touch feedback indicative of the gesture associated with the respective region within which the touch-feedback interface is disposed.

In various instances, the touch-feedback interface may include a plurality of such interfaces disposed on the graphic overlay within a respective plurality of regions depicted by the graphic overlay. In these instances, the touch-feedback interfaces may include structures shaped to provide touch feedback indicative of the gestures associated with the respective regions within which the touch-feedback interfaces are disposed. Also in these instances, the gesture associated with at least one of the respective regions may differ from the gesture associated with at least one other of the respective regions.

In a more particular example, the gestures may include a movement interaction defining bidirectional movement in a predetermined direction. In this example, the touch-feedback interface may include one or more elongated elements. The elongated elements may include projections or indentions; and in one more particular example, at least one of the elongated elements may be formed of a plurality of smaller, similarly-shaped elements that include projections or indentions.

The length of each of the elongated elements extends along the predetermined direction, and the width of each of the elongated elements extends across the predetermined direction, where the length is a longer dimension than the width. In this regard, the touch-feedback interface is shaped to stimulate with a user different first and second tactile or haptic perceptions in instances in which the user drags the object over the touch-feedback interface along the length or along the width (across the length) of the elongated element(s).

In another example, the gestures may include a movement interaction defining omnidirectional movement in any direction in a plane parallel to the graphic overlay. In this example, the touch-feedback interface may include a plurality of similarly-shaped elements arranged in a matrix of elements, where the similarly-shaped elements include projections or indentions. In this example, the touch-feedback interface is shaped to stimulate with a user the same tactile or haptic perception in instances in which the user drags the object over the touch-feedback interface in any direction in the plane parallel to the graphic overlay.

In an additional or alternative example, the function associated with a gesture may be a rate-varying function. In this example, the touch-feedback interface may include a plurality of elongated elements each of which has an associated velocity with which the function is capable of being carried out.

According to another aspect of exemplary embodiments of the present invention, an apparatus is provided that includes a touch-sensitive surface with which an object comes into contact. Similar to before, the touch-sensitive surface is divided into a plurality of regions each of a number of which is associated with a distinct set of one or more of the plurality of gestures. According to this aspect, the touch-sensitive surface includes a display configured to present an image visibly depicting the regions and a layout of the regions into which the touch-sensitive surface is divided.

The apparatus of the second aspect may further include a touch-feedback interface configured to interact with a region depicted by the display. The touch-feedback interface of this aspect includes circuitry configured to provide touch feedback indicative of the gesture associated with the respective region with which the touch-feedback interface is configured to interact.

In various instances, the touch-feedback interface may be configured to interact with a plurality of regions depicted by the display. In these instances, the touch-feedback interface may include circuitry configured to provide touch feedback indicative of a plurality of gestures associated with a respective plurality of regions with which the touch-feedback interface is configured to interact.

In one example, the gestures include a movement interaction defining bidirectional movement in a predetermined direction. In this example, the touch-feedback interface circuitry may be configured to generate an electric field that stimulates with a user a first tactile or haptic perception in instances in which the user drags the object through the electric field along the predetermined direction, and a second, different tactile or haptic perception in instances in which the user drags the object through the electric field across the predetermined direction.

In another example, the gestures may include a movement interaction defining omnidirectional movement in any direction in a plane parallel to the display. In this example, the touch-feedback interface circuitry may be configured to generate an electric field that stimulates with a user the same tactile or haptic perception in instances in which the user drags the object through the electric field in any direction in the plane parallel to the display.

Exemplary embodiments of the present invention therefore provide an improved apparatus for interacting with a software application via a touch-sensitive surface divided into regions associated with respective functions. As indicated above, and explained below, exemplary embodiments of the present invention may solve problems identified by prior techniques and provide additional advantages.

BRIEF DESCRIPTION OF THE DRAWINGS

Figure 1:
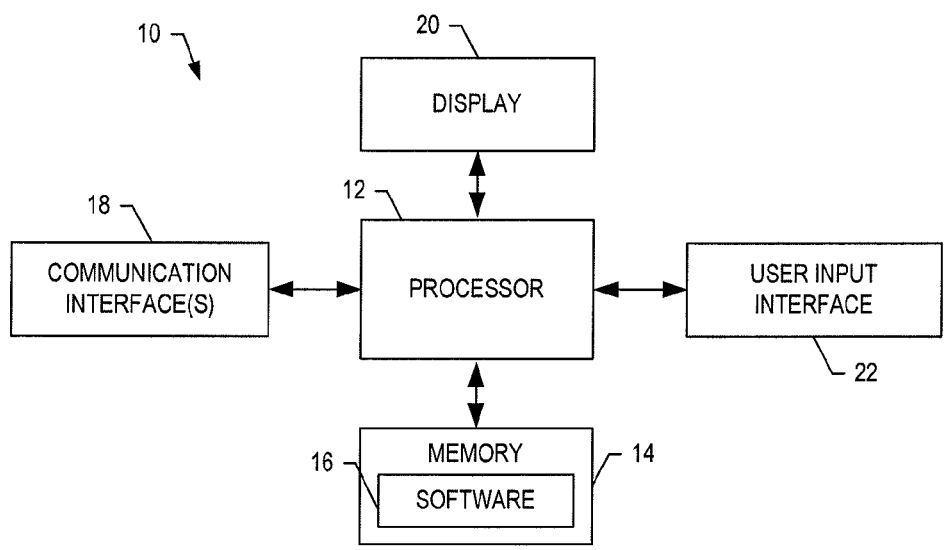
Figure 2A:
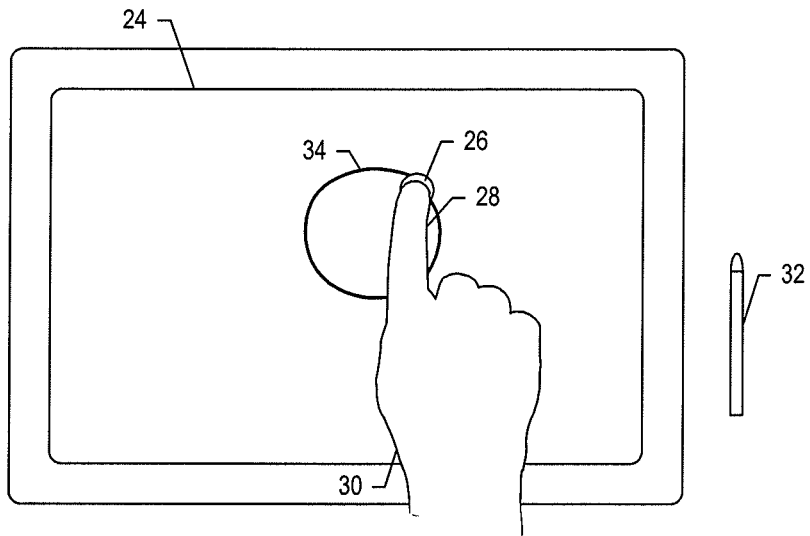
Figure 2B:
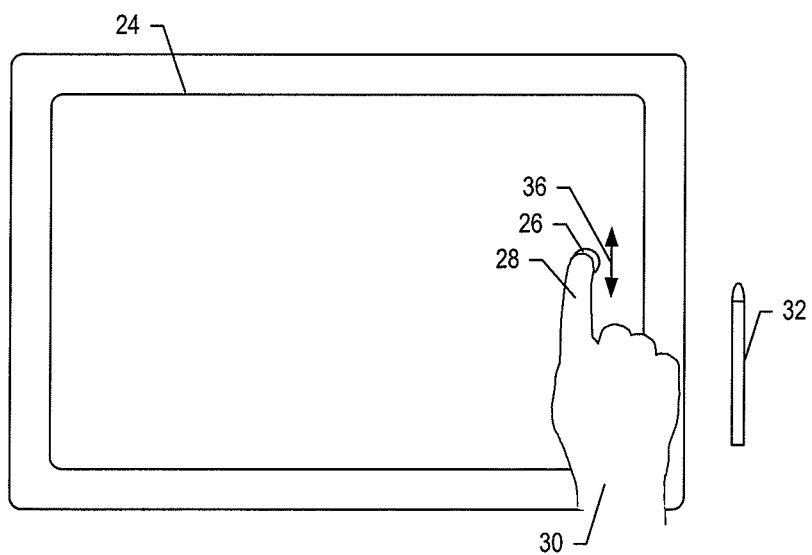
Figure 3:
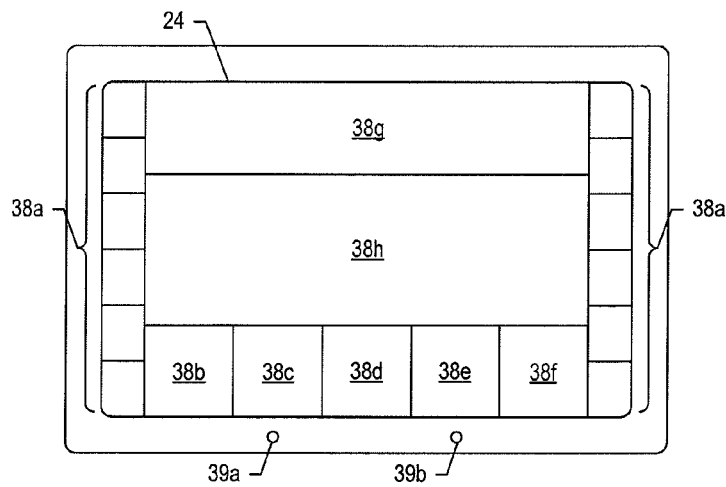
Figure 4:
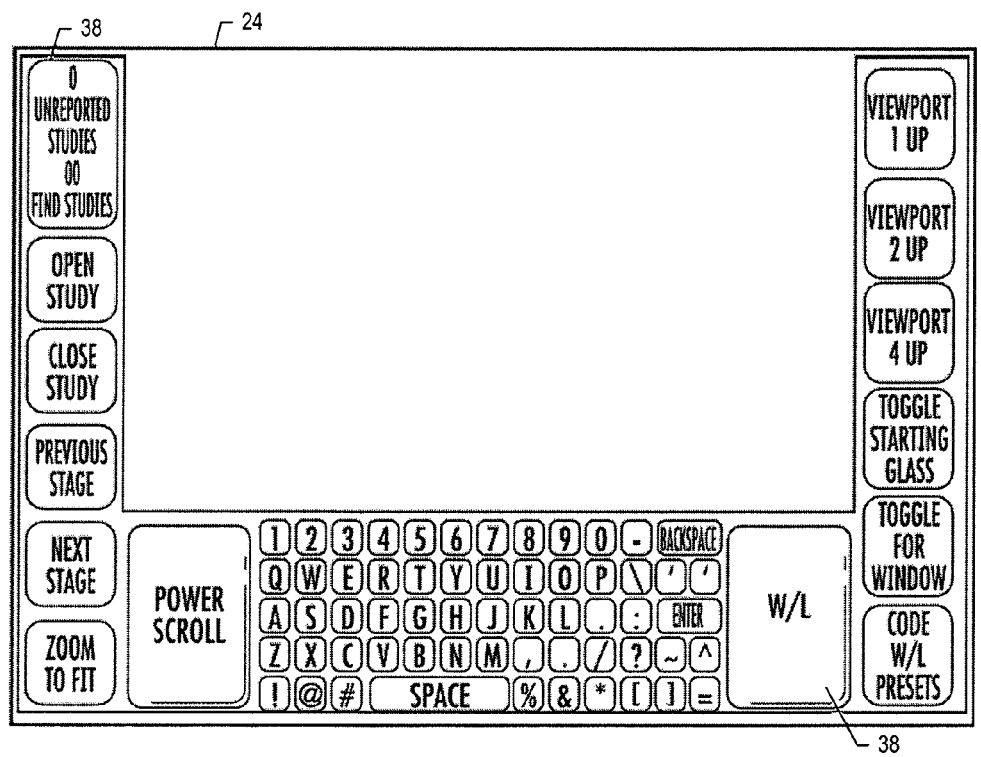
Figure 5A:
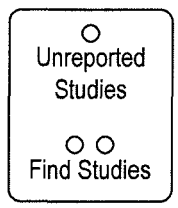
Figure 5B:
Figure 5C:
Figure 6:
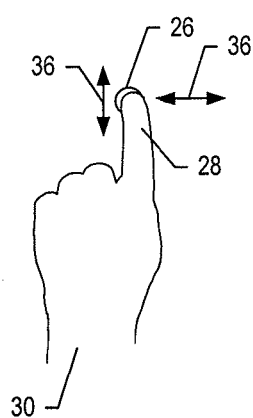
Figure 7:
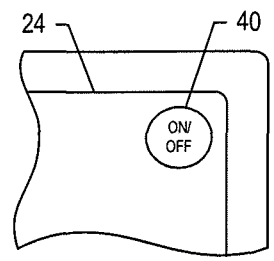
Figure 8:
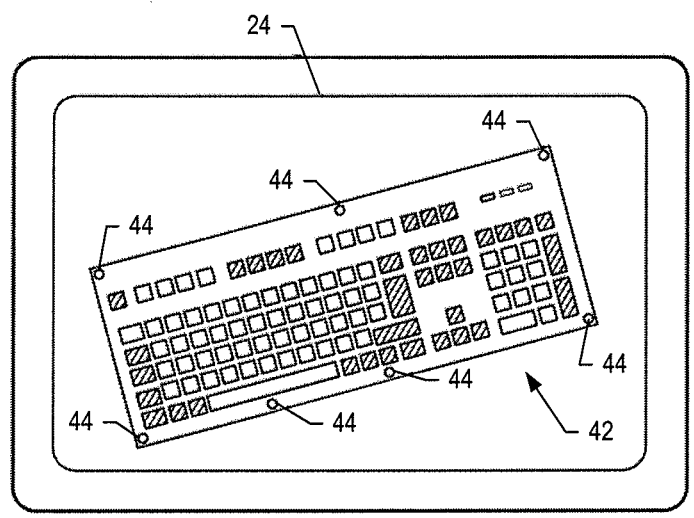
Figure 9:
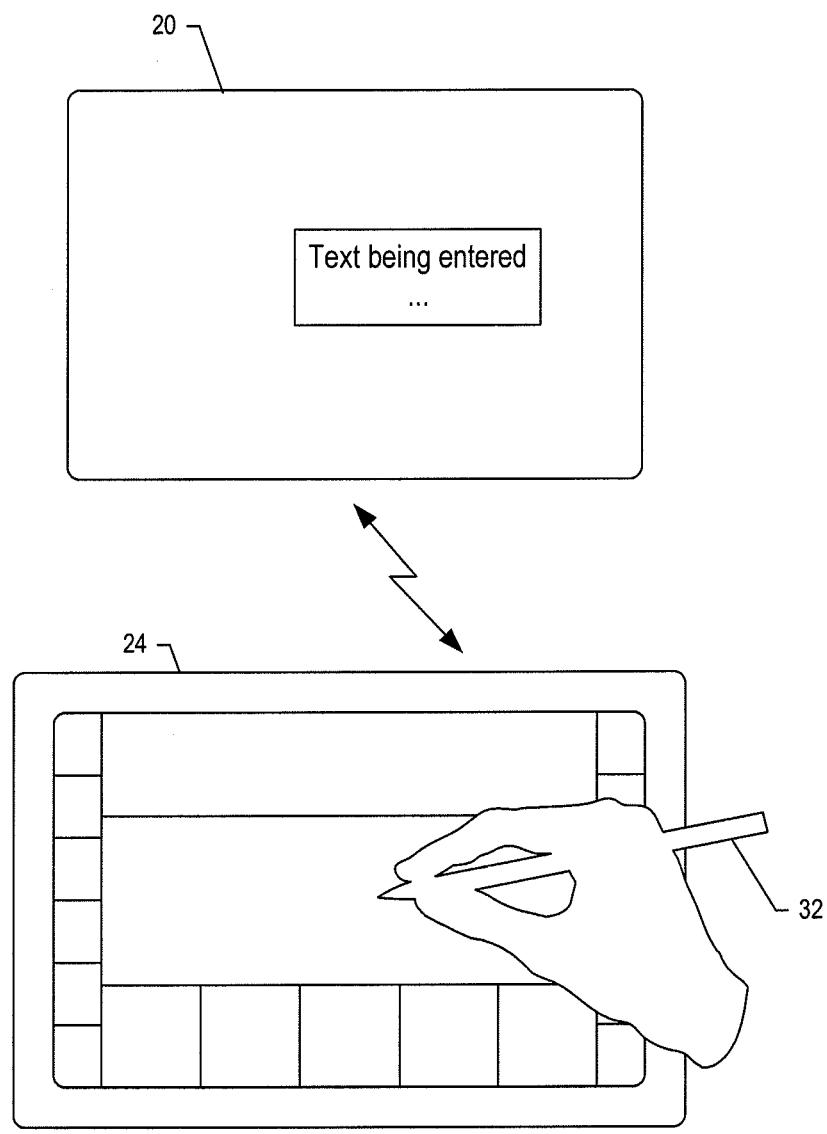
Figure 10:
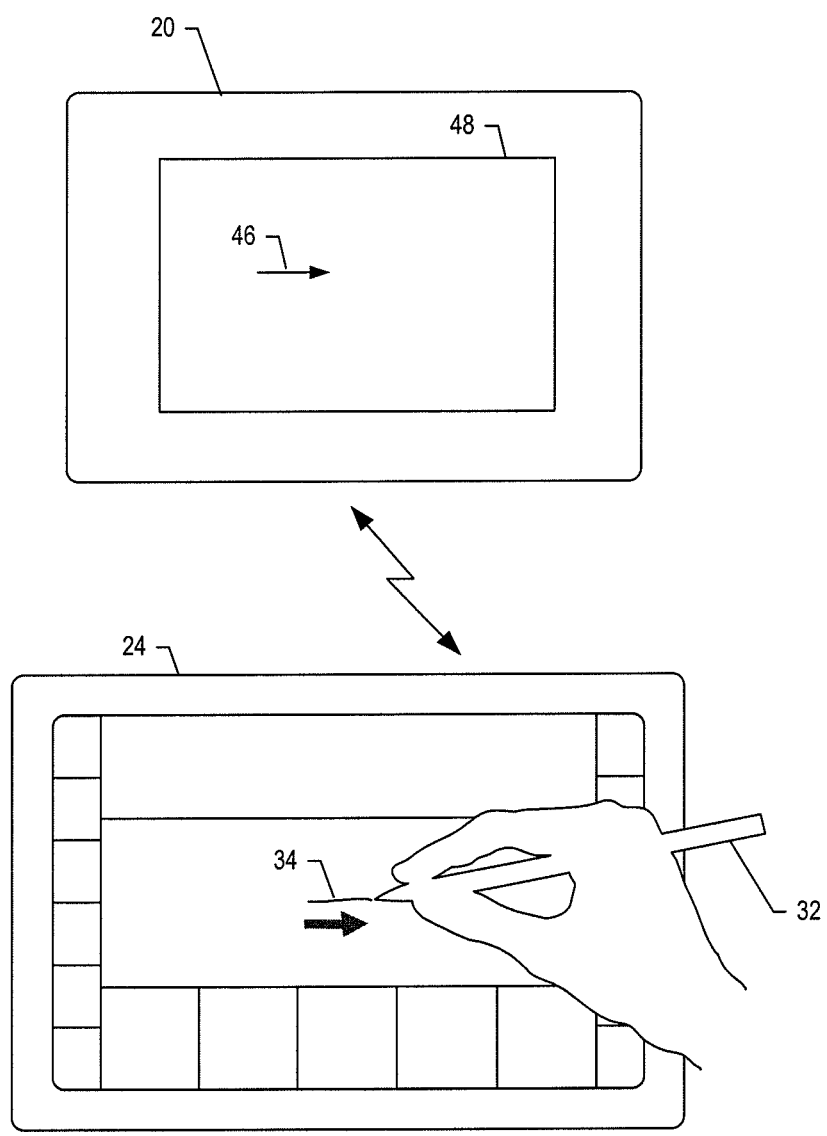
Figure 11:
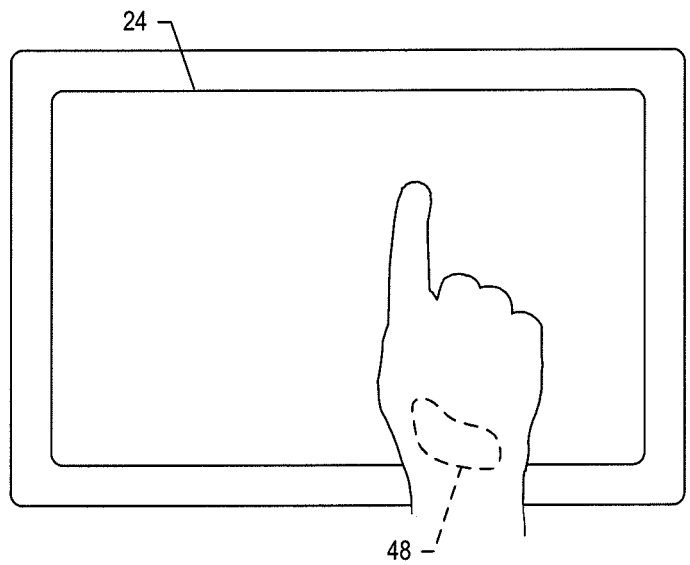
Figure 12:
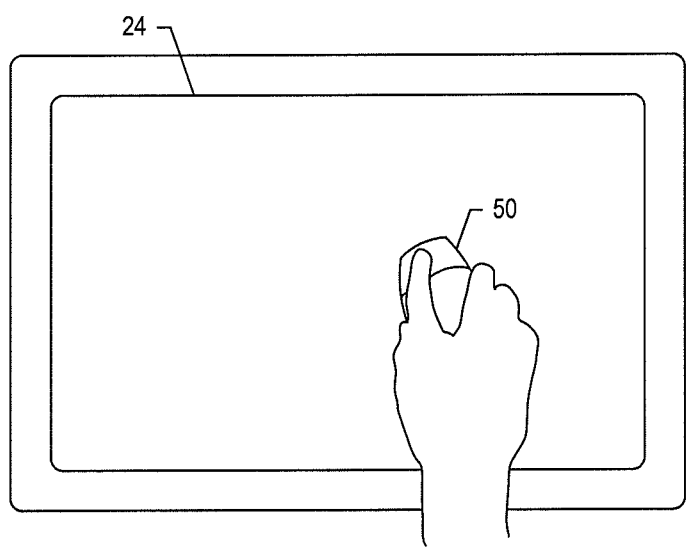
Figure 13:
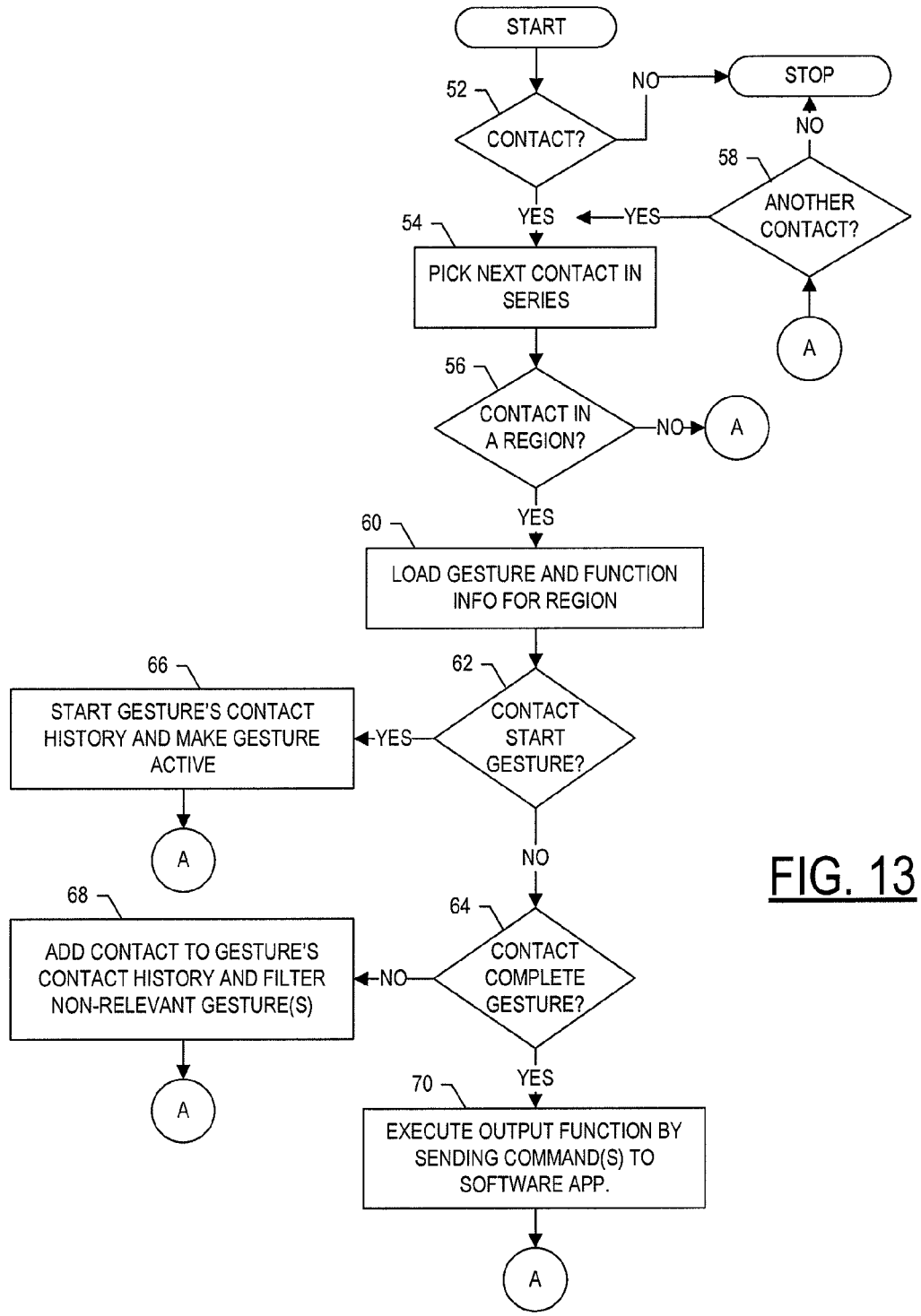
Figure 16:
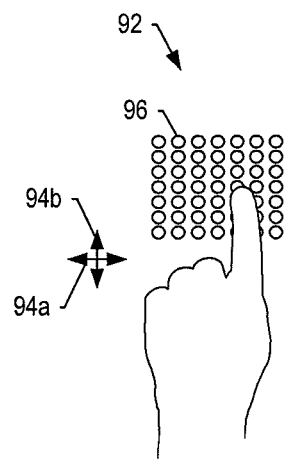

Having thus described the invention in general terms, reference will now be made to the accompanying drawings, which are not necessarily drawn to scale, and wherein:

FIG. 1 is a schematic block diagram of an apparatus configured to operate in accordance with embodiments of the present invention;

FIGS. 2a and 2b are schematic block diagrams of a touch-sensitive surface and an object that may come into contact with that surface to effectuate a trace or movement interaction, according to exemplary embodiments of the present invention;

FIGS. 3 and 4 illustrate block diagrams of division of a touch-sensitive surface into a plurality of regions, according to exemplary embodiments of the present invention;

FIGS. 5a-5c are schematic block diagrams illustrating a region and gestures that may be implemented with respect to the region, according to exemplary embodiments of the present invention;

FIG. 6 is a schematic block diagram illustrating a gesture including a single-finger touching and dragging in a horizontal or vertical direction, according to exemplary embodiments of the present invention;

FIG. 7 is a schematic block diagram of a region defined as a toggle on-off region for activating-deactivating one or more other defined regions, according to exemplary embodiments of the present invention;

FIG. 8 is a schematic block diagram of a passive keyboard, according to exemplary embodiments of the present invention;

FIG. 9 is a schematic block diagram of a user free-form handwriting directly on a touch-sensitive surface, and a corresponding display that may result, according to exemplary embodiments of the present invention;

FIG. 10 is a schematic block diagram of a user annotating an image presented on a display by writing directly on a touch-sensitive surface, according to exemplary embodiments of the present invention;

FIGS. 11 and 12 are schematic block diagrams of parts of a user's hand and mouse, respectively, that may generate points of contact for which it may be desirable to ignore, according to exemplary embodiments of the present invention;

FIG. 13 is a flowchart illustrating various steps in a method of processing one or more points of contact according to exemplary embodiments of the present invention; and FIGS. 14-16 illustrate touch-feedback interfaces according to example embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, references may be made herein to directions and orientations including vertical, horizontal, diagonal, right, left, up and down; it should be understood, however, that any direction and orientation references are simply examples and that any particular direction or orientation may depend on the particular object, and/or the orientation of the particular object, with which the direction or orientation reference is made. Like numbers refer to like elements throughout.

Referring to FIG. 1, a block diagram of one type of apparatus configured according to exemplary embodiments of the present invention is provided ("exemplary" as used herein referring to "serving as an example, instance or illustration"). The apparatus and method of exemplary embodiments of the present invention will be primarily described in conjunction with medical-imaging applications. It should be understood, however, that the method and apparatus of embodiments of the present invention can be utilized in conjunction with a variety of other applications, both in the medical industry and outside of the medical industry. Further, the apparatus of exemplary embodiments of the present invention includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention.

Generally, the apparatus of exemplary embodiments of the present invention may comprise, include or be embodied in one or more fixed electronic devices, such as one or more of a laptop computer, desktop computer, workstation computer, server computer or the like. In a more particular example, the apparatus may comprise, include or be embodied in a picture archiving and communication system (PACS) or other medical-imaging system workstation. Additionally or alternatively, the apparatus may comprise, include or be embodied in one or more portable electronic devices, such as one or more of a mobile telephone, portable digital assistant (PDA), pager or the like.

As shown in FIG. 1, the apparatus 10 of one exemplary embodiment of the present invention may include a processor 12 connected to a memory 14. The memory can comprise volatile and/or non-volatile memory, and typically stores content, data or the like. In this regard, the memory may store content transmitted from, and/or received by, the apparatus. The memory may also store one or more software applications 16, instructions or the like for the processor to perform steps associated with operation of the entity in accordance with exemplary embodiments of the present invention (although any one or more of these steps may be implemented in hardware alone or in any combination with software and/or firmware). This software may include, for example, a gesture-recognition engine configured to receive and interpret data from a touch-sensitive surface for directing performance of one or more functions of the apparatus. In addition, the software may include software applications (e.g., medical-imaging software, Internet browser, etc.), one or more operations of which may be directed by the gesture-recognition engine (and, hence, the user of the apparatus via interaction with a touch-sensitive surface).

In addition to the memory 14, the processor 12 may also be connected to at least one interface or other means for displaying, transmitting and/or receiving data, content or the like. In this regard, the interface(s) may include at least one communication interface 18 or other means for transmitting and/or receiving data, content or the like, such as to and/or from other device(s) and/or network(s) coupled to the apparatus. In addition to the communication interface(s), the interface(s) may also include at least one user interface that may include one or more wireline and/or wireless (e.g., Bluetooth) earphones and/or speakers, one or more displays 20, and/or a user input interface 22. The user input interface, in turn, may comprise any of a number of wireline and/or wireless devices allowing the entity to receive data from a user, such as a microphone, an image or video capture device, a keyboard or keypad, a joystick, or other input device.

According to a more particular exemplary embodiment, the user input interface 22 may include a touch-sensitive surface and/or one or more biometric sensors. The touch-sensitive surface may be integral with or separate from a display 20, although it should be understood that even in instances in which the touch-sensitive surface is integral with a display (forming a touch-sensitive display), the apparatus 10 may additionally include a further display (e.g., primary display) separate and distinct from the touch-sensitive display (e.g., reference display). The biometric sensor(s), on the other hand, may include any apparatus (e.g., image capture device) configured to capture one or more intrinsic physical or behavioral traits of a user of the apparatus such as to enable access control to the apparatus, provide presence information of the user relative to the apparatus, or the like.

Referring to FIGS. 2a and 2b, the touch-sensitive surface 24 may be configured to detect (or otherwise capture) and provide data representative of points on the surface with which one or more objects come into contact (points of contact 26), and as well as the size of each point of contact (e.g., through the area of the contact point, the shadow size of the contact point, etc.). These objects may include one or more fingers 28 of one or both hands 30 of a user (or more generally one or more appendages of a user), as well as one or more objects representing instruments otherwise designed for use in paper-based systems. Objects representing instruments may include, for example, a stylus 32, pen or other similarly-shaped object (e.g., felt-tipped cone-shaped object) representing a writing instrument (e.g., grease pencil), a rectangular object representing a ruler, a closed-shaped (e.g., rectangular, circular, etc.) object representing a magnifying glass, or the like. Exemplary embodiments of the present invention may be described herein with respect to contact or movement of a finger or stylus relative to the touch-sensitive surface. It should be understood, however, that any finger contact or movement may alternatively be performed by a stylus; and similarly, any stylus contact or movement may alternatively be performed by a finger.

In accordance with exemplary embodiments of the present invention, the touch-sensitive surface 24 may be configured to detect points of contact 26 of one or more objects (e.g., fingers 28, stylus 32) with the surface. The touch-sensitive surface may be configured to detect points of contact in accordance with any of a number of different technologies. Examples of suitable touch-sensitive technologies include resistive, capacitive, surface acoustic wave, surface capacitance, projected capacitance, optical (e.g., infrared), strain gauge, dispersive signal, acoustic pulse recognition or other similar technologies. Other examples of suitable touch-sensitive technologies include force sensitive resistor (FSR), quantum tunnelling composite (QTC), Stantum-type touch sensors (by Stantum of Bordeaux, France) or the like.

Upon detection of one or more points of contact 26, an accompanying gesture-recognition engine (software application 16), then, may be configured to receive and interpret data representative of those points of contact, and interpret those points of contact (including concatenated points of contact representative of a trace 34 as in FIG. 2a or movement 36 as in FIG. 2b) into commands or other instructions for directing performance of one or more functions of the apparatus 10, or more particularly in various instances, functions of a software application operating on the apparatus. In various instances, execution of these functions may effectuate a change in a graphical output presented by the display 20 during operation of the application. At any instant in time, the touch-sensitive surface and gesture-recognition engine may be capable of detecting and interpreting a single touch point (single-touch) or multiple simultaneous touch points (multi-touch).

In accordance with exemplary embodiments of the present invention, the touch-sensitive surface 24 may be divided into regions each of which is associated with a distinct set of one or more gestures and respective functions of the apparatus 10 or software application for which the gesture(s) direct operation. The regions may but need not have a rectangular shape. The regions may be visibly represented by a removable physical graphic overlay for the touch-sensitive surface, or by an image presented on a display 20. In the instance of a physical graphic overlay, the overlay may include one or more bumps or projections intended to guide the user relative to the layout without requiring the user to keep an eye on the layout.

In either instance of visibly representing the regions, the regions may be visibly represented with an optional text label and/or iconic image shown to identify the functions associated with the respective regions. A general example of a touch-sensitive surface divided into regions 38 is shown in FIG. 3 (a particular example layout of which is described below), which also includes guide bumps 39a, 39b; and a more particular example in the context of an application of a PACS workstation is shown in FIG. 4. As will be appreciated, the regions may be defined with any particular granularity. Any region may be further divided into sub-regions, which may be further divided into sub-sub-regions, and so forth. Similarly, any two or more regions may be grouped into a super-region, which may itself be grouped with one or more other regions into a super-super-region, and so forth. Thus, the following description with respect to regions may equally apply to sub-regions or super-regions.

Each region 38 may provide a mapping between a distinct set of one or more gestures (e.g., point(s) of contact 26, traces 34 and/or movements 36) and respective functions of the apparatus 10 or software application. That is, the gesture-recognition engine may detect one or more gestures as inputs, and in response thereto, direct respective functions of the apparatus or software application as outputs. The gestures within a set or across sets may be implemented in any appropriate sequence, or in various instances, multiple gestures may be implemented simultaneously. In the context of a PACS workstation, for example, gestures may be associated with imaging functions such as open a currently-selected study, close a study, zoom within an image in a selected viewport to fit the viewport size, change the viewport layout, scroll through a series, adjust an image window and level or the like. Gestures that may be simultaneously-implementable include those for functions such as simultaneous zoom and scroll, zoom and pan, scroll and adjust window and level or the like. Through division of the touch-sensitive surface into regions, exemplary embodiments of the present invention may allow a user to more immediately access their common functions through gesturing on visible, and possibly labeled, regions.

In various instances, a region 38 may be associated with a single point of contact 26 (single-touch) or multiple simultaneous points of contact (multi-touch), and may be configured to require the point(s) of contact to have at least a threshold force value (force of contact of the finger(s) on the touch-sensitive surface 24)—ignoring points of contact having less than the threshold force value. Such a region may be considered a virtual button, and may have the capability of being activated with a configurable number of simultaneous touch points (≥1) and at a configurable force threshold. An example of a region configured as a virtual button is shown in FIGS. 5a, 5b and 5c in the context of a PACS workstation. As shown in FIG. 5a, the region may be configured such that a single point of contact (FIG. 5b) may direct the software application to initiate an interface for selecting an unreported study, and such that a dual point of contact (FIG. 5c) may direct the software application to initiate an interface for finding a study.

Other regions 38 may be defined to vary a software application value through a range. Examples of varying a value through a range include scrolling a series of images, adjusting image parameters such as scale (zoom), translation (pan) and orientation (rotation), drawing an annotation such as a distance measure or arrow or the like. These regions may implement single or multiple-finger (from one or both hands 30) movement 36 interactions to vary the respective software application value. As shown in FIG. 6, for example, a single-finger touching and horizontal or vertical dragging within a particular region may direct a software application to scroll through or within one or more displayed images, documents or other windows in the respective direction. Similar to above, initiation of the output function for these regions may be dependent on the finger points of contact having at least a threshold force value.

For rate-varying functions (or equally other appropriate functions), the amount of applied force of contact of the finger(s) on the touch-sensitive surface 24 may vary a rate at which a respective value changes as the movement interaction is performed. For example, when scrolling through displayed images, the velocity of the scrolling function may be dependent upon an amount of applied force of contact of the finger(s) effectuating the respective function. Or in another instance, a number of fingers applied to carry out the movement interaction may vary a rate at which a respective value changes (e.g., one finger indicating one velocity, and two fingers indicating another velocity). In yet another instance, a combination of applied force and number of fingers may change the velocity of the value change.

If so desired, a single region 38 may be defined for the entire area of the touch-sensitive surface 24, or two or more regions may be defined so as to overlap. As shown in FIG. 7, for example, a region 40 may be defined as a toggle on-off region for activating-deactivating one or more other defined regions; and in this manner, when the respective region is toggled off, the touch-sensitive surface may operate as a static surface that does not act on any contacts, except for the gesture that toggles the on—off region. One or more hidden regions may also be incorporated. Additionally or alternatively, for example, a small region may be defined at a corner of the touch-sensitive surface for a software application reset function, and for which a gesture may be defined that would not ordinarily be accidentally initiated, such as a longer duration press at a higher than usual force threshold.

Different users may have different layouts of regions 38 for directing functions of the same or different software applications, such as to account for user preferences. Different applications may have different layouts, or different modes of operation of the same application may have different layouts. In the context of a PACS workstation, for example, different modalities of a medical imaging study may have different layouts, such as a computerized tomography (CT) study and mammography study having different layouts.

According to exemplary embodiments of the present invention, a layout may have a physical graphical overlay with a set of one or more uniquely-placed, physical contacts that, when the overlay is placed on the touch-sensitive surface 24, may be detected by the touch-sensitive surface and interpreted by the apparatus 10 to correspond to the respective layout. In such instances, the apparatus may store configuration files for these layouts indexed according to the placement of their respective sets of contacts so that the desired configuration file may be recalled upon detection of a particular set of contacts. Even further, the locations of the regions 38 of the layout may be referenced to the contacts such that the physical graphical overlay may be placed in any of a number of positions and orientations on the touch-sensitive surface, and the apparatus may determine the position and orientation of the overlay and its regions based on detection of the contacts. Thus, although the apparatus may receive user input to designate a particular layout for operation, the apparatus may automatically detect the particular layout—as well as its position and orientation on the touch-sensitive surface—as a function of the unique placement of contacts detected by the apparatus.

In a more particular example, as shown in FIG. 8, consider the keyboard layout 42 divided into keys (regions) and represented by a physical graphical overlay including uniquely-placed contacts 44. The keyboard may have a corresponding physical graphical overlay with contacts that identify the keyboard and the placement of the keys on the overlay such that, upon placement of the keyboard overlay on the touch-sensitive surface 24, the keyboard and its position and orientation may be detected by the apparatus 10. Such a keyboard and its overlay may be generally referred to as a "passive keyboard." The apparatus of exemplary embodiments of the present invention may therefore permit a user to enter information using the passive keyboard, and without requiring the apparatus to include or be otherwise coupled to a physical keyboard.

In instances in which more touch feedback is desired, the keyboard overlay representing the keyboard layout 42 may be constructed to appear similar to a conventional keyboard including physical keys but without internal electronics, and configured such that the downward pressing of its keys may cause a corresponding contact of the touch-sensitive surface 24. In these instances, the contacts 44 may serve to not only identify the keyboard and detect its position and orientation, but may also serve to raise the keyboard layout above the touch-sensitive surface. This may allow the physical keys of the keyboard to be pressed down creating an additional contact that can be detected by the touch-sensitive surface.

In addition to defining regions 38 to be associated with gestures directing functions of the apparatus 10 or a software application, a region may be defined for capturing digital handwritten notes, signatures, drawings or other free-form digital handwriting. In such instances, a user may, for example, place a piece of paper on the touch-sensitive surface 24 over a region defined for digital handwriting capture, and using a standard writing instrument such as a pen or pencil, write out a note or drawing on the paper; and simultaneously or nearly simultaneously, the touch-sensitive surface may capture a digital representation of the note or drawing. Or in another example, if the user does not require a paper copy, the user may simply write directly on the touch-sensitive surface using an instrument such as a writing stylus 32, as shown in FIG. 9.

In any instance, however, the captured free-form handwriting may be converted or otherwise formatted in any of a number of different manner suitable for storage, display or further processing. Handwritten text may, for example, be converted into ASCII text (e.g., for presentation on a display 20, as in FIG. 9) or a suitable image format, into which handwritten signatures, drawings or the like may also be converted. In a more particular example in the context of a PACS workstation, handwritten text and drawings may be captured and formatted for use by Jot Pad PACS software in which a user may typically mark up a template showing a drawing of human anatomy with additional notes and annotations (e.g., ellipses, arrows, lines, etc.) that may be desired for interpretation of the study, and in which the entire marked up template may be saved in an image format. In another example in the same context, images may be annotated within a medical image study with typical PACS annotation drawings including a text annotation that may be converted into ASCII text for display and/or storage. FIG. 10 illustrates another example annotation in the form of an arrow 46 on a medical image 48 presented by the display 20, where the arrow may be added by an appropriate trace 34 in a region 38 of the layout.

By including a region defined for capturing free-form digital handwriting, the apparatus 10 of exemplary embodiments of the present invention may provide a multi-purpose, configurable input device that accounts for different manners by which the user may desire to interact with the apparatus or software application operating on the apparatus. That is, the touch-sensitive surface 24 including an appropriate layout may not only permit control of the apparatus or software application, but it may also permit the inputting of text and free-form handwriting including hand written notes, drawings and annotations—and may do so using the same pen or pencil as the user would otherwise use in a non-digital environment.

Returning to the general example of FIG. 3, a layout of regions 38 for directing operation of a software application may include regions 38a associated with shortcuts for carrying out various functions of the software application. The layout may also include regions associated with scrolling (region 38b), zooming (region 38c), mouse control (region 38d), panning (region 38e) and/or window and level control (region 38O. Even further, the layout may include a region 38g that may itself be further divided into sub-regions for operation as a virtual keyboard (each sub-region corresponding to a key), and may include a region 38h for detecting a number of gestures for carrying out additional functions of the apparatus—and possibly also for capturing free-form digital handwriting.

In a further aspect, exemplary embodiments of the present invention may be configured to distinguish between intended and unintended contacts with the touch-sensitive surface 24, and may be configured to ignore unintended contacts. For example, for a user to be comfortable using the touch-sensitive surface, the user may desire to rest the heel or side of their hand(s) and part of their arm(s) on the surface. And the user may desire to have this extraneous contact with the touch-sensitive surface without having the contact cause the underlying regions to assume they are actionable contacts, and yet still allow the user's finger(s) 28 or stylus 32 to provide input to regions on the touch-sensitive surface. As an arm or hand resting on the surface may produce a larger contact area than a finger or stylus, the gesture-recognition engine may be configured to detect and reject or otherwise ignore (as an input) contacts greater than a threshold size. An example of such an increased-size contact area 48 is shown in FIG. 11. Additionally or alternatively, for example, the user may desire to continue to use a mouse for some input control and use the touch-sensitive surface as their mouse pad. The gesture-recognition engine may be configured to detect a mouse's contact pads resting on the surface and reject that contact input. This is shown for example in FIG. 12 in the context of a mouse 50 being utilized on top of the touch-sensitive surface.

As suggested above, the layout of the regions 38 and their associated gestures and functions, as well as any other related parameters (e.g., applied force) and/or apparatus or software application parameters (e.g., application windows to which functions may be directed), may be configurable and stored in a configuration file. The configuration file may define the regions of the layout in a coordinate space relative to the touch-sensitive surface 24, such as by defining x-y coordinate areas of the regions; and for each region, may specify a set of one or more gestures and associated functions (or actions). The configuration file may be formatted in any of a number of different manners, such as in an extensible markup language (XML) file including XML schema, an example of which is presented in an Appendix below. A particular layout of regions may include a visible representation (e.g., physical graphic overlay or presented image) and configuration file, and multiple layouts may be selectively implemented by the apparatus. Also, changes to the regions or their associated gestures or functions may be carried out by changing or replacing the configuration file, and similarly changing or replacing the visible representation of the regions (e.g., physical graphic overlay or presented image).

Reference is now made to FIG. 13, which illustrates various steps in a method of processing one or more points of contact according to exemplary embodiments of the present invention. As shown, the gesture-recognition engine may be configured to operate based on repetitive polling periods during which the gesture-recognition engine is configured to repetitively receive data representative of a series of one or more points of contact—and following which the gesture-recognition engine is configured to interpret and operate based on the captured point(s) of contact. It should be understood, however, that the gesture-recognition engine may alternatively be configured to operate without defined polling periods, and may be configured to dynamically process points of contact as they are captured.

As shown in FIG. 13, a process followed by the gesture-recognition engine at the conclusion of a polling period may include determining if the gesture-recognition engine received data representative of any points of contact, and ending the process if the engine did not receive any such data, as shown in block 52. This data may include, for example, x-y coordinates of each point of contact, and may also include other parameters such as an applied force by which the touch-sensitive surface 24 detected the point of contact. And as described herein, references to the gesture-recognition engine receiving, interpreting or otherwise processing a point of contact may more particularly refer to the gesture-recognition engine receiving, interpreting or otherwise processing data representative of the respective point of contact.

When a series of one or more points of contact are captured during a polling period, the gesture-recognition engine may be configured to pick the first (or next) point of contact in the series and determine if this current point of contact is from within a defined region 38, as shown in blocks 54 and 56. This may be accomplished, for example, by determining if the x-y coordinates of the respective point of contact is within the x-y area of a defined region. When the current point of contact is not within a defined region, the gesture-recognition engine may be configured to determine if the series includes any other points of contact, and if so, select the next point of contact and repeat the process, as shown in block 58 and again in blocks 54 and 56.

When the current point of contact is within a defined region 38, and for each subsequent point of contact within the same or another defined region, the gesture-recognition engine may be configured to load information defining the gestures and associated functions for the respective region, such as from the configuration file for the particular layout, as shown in block 60. The gesture-recognition engine may then be configured to determine if the current point of contact starts or completes a gesture, as shown in blocks 62 and 64. When the current point of contact starts a gesture, such as in the case of the first point of contact within a defined region, the gesture-recognition engine may be configured to start a contact history for the gesture, as shown in block 66. And when the current point of contact does not start a gesture but also does not complete a gesture, the gesture-recognition engine may be configured to add to the contact history for the gesture, as shown in block 68.

As the gesture-recognition engine builds the contact history, the gesture-recognition engine may be configured to compare the gesture being defined by the contact history with the loaded information defining the gestures for the respective region 38, and may be configured to filter out any of the region's gestures that do not match or substantially match the gesture being defined, as shown in block 68. Upon completion of the gesture defined by the contact history, then, a single match or substantial match may be made between the respective gesture and the region's gestures; and from this match, the gesture-recognition engine may be configured to identify and execute the function associated with the matching gesture, as shown in block 70. The gesture-recognition engine may then be configured to continue processing any further points of contact, or may reset for the next polling period.

As explained above, the apparatus may include one or more displays 20, and may include a display (e.g., primary display) separate and distinct from the touch-sensitive surface 24, and/or a touch-sensitive display (e.g., reference display) including an integral display and touch-sensitive surface. As also explained above, the display(s) may be configured to present a graphical output that may be changed during operation of an application, and/or may be configured to present an image visibly representing a layout of regions 38. The number and manner of presentations of the display(s) may be carried out in a number of different manners. For example, a primary display may be configured to present the graphical output of the application, while a reference display may present an image of a layout of regions.

As another example, a reference display may not only present an image of a layout of regions 38, but the reference display may also present a portion or all of the graphical output of an application—such as in a general purpose region of the layout (e.g., FIG. 3, region 38*h*). In such instances, the apparatus 10 may or may not include a separate primary display. This arrangement of a reference display may be controlled by configuration, and may permit a user to input annotation drawings, text annotation entry or the like directly on top of a copy of the graphical output, such as where the respective annotations are being added to the graphical output. It may also permit the user to control a cursor on the graphical output in a more-typical touch-screen manner, using an absolute mapping of touch-sensitive surface coordinate system to graphical output coordinate system, rather than the relative mapping that may otherwise be used such as in the context of a typical laptop touch pad.

As indicated above with reference to FIG. 8, in various instances, touch feedback may be desired while interacting with the touch-sensitive surface 24. In the context of a keyboard layout 42, for example, this feedback may be provided by a keyboard overlay constructed to appear similar to a conventional keyboard including physical keys. In accordance with example embodiments of the present invention, the visible representation (e.g., physical graphic overlay, presented image) of each region of one or more regions 38 of a layout of regions may include a touch-feedback interface configured to provide touch feedback indicative of the set of gesture(s) and respective function(s) associated with the respective region. As explained herein, the term "touch feedback" may refer to feedback provided by a user's passive touch or active touch. The term "passive touch" may refer to tactile perception, and the term "active touch" may refer to combined tactile and kinesthetic perceptions (haptic perception). Thus, touch feedback may include tactile feedback, haptic feedback or tactile-haptic feedback.

The touch-feedback interface may be implemented in a number of different manners. In one example, the touch-feedback interface may be implemented as a physical structure shaped to provide touch feedback, which may be particularly useful in the context of a physical graphic overlay representing the regions of the layout. In another example, the touch-feedback interface may be implemented as circuitry configured to generate an electrical field that stimulates with the user the same or similar tactile perception and/or kinesthetic perception as a physical structure, or which otherwise causes the user to experience a particular tactile perception and/or kinesthetic perception in instances in which the user interacts with the interface. This may be particularly useful in the context of an image of the regions presented on a display 20 such as a display integrated with the touch-sensitive surface and the interface circuitry. An example of a technology that may be incorporated into suitable circuitry is the E-Sense technology developed by Senseg of Helsinki, Finland.

A number of example touch-feedback interfaces in the form of physical structures will now be described with reference to FIGS. 14-16. It should be understood, however, that similar touch-feedback interfaces may be implemented as circuitry configured to generate an electrical field that stimulates with the user the same or similar perception(s) as the physical structures of the respective figures.

As indicated above, the gestures that may be implemented in accordance with example embodiments of the present invention include movement 36 interactions configured to direct a software application to vary a value through a range (e.g., scroll through images, adjust image parameters, etc.). The movement interaction configured to direct varying a particular value may include, for example, a single or multiple-finger touching and horizontal or vertical dragging within a particular region. Even further, the movement interaction may be bidirectional (e.g., left and right, up and down) in the vertical or horizontal, or may be omnidirectional in the vertical and horizontal. In each of one or more of these regions, the touch-feedback interface may be shaped to cause in the user different haptic perceptions in response to the user dragging their finger(s) over the interface in the respective directions. For bidirectional movement interactions, the vertical case will be more particularly explained below, but it should be understood that example embodiments may equally apply to the horizontal case.

Consider, for example, a region associated with a bidirectional vertical movement interaction. In this example region, the touch-feedback interface may be shaped to cause in the user a first haptic perception in response to the user dragging their finger(s) over the interface in the respective vertical direction (e.g., up and down), and cause in the user a second haptic perception in response to the user dragging their finger(s) over the interface in other directions, such as a horizontal direction (e.g., left and right). The touch-feedback interface may be shaped in a number of different manners to effect the different tactile or haptic perceptions, but in one example embodiment, the touch-feedback interface has a length that extends along (parallel with) the desired vertical direction, and a width that extends across (perpendicular to) the desired vertical direction. The length of an element such as the touch-feedback interface may represent a longer dimension than the width of the element.

Haptic perception with respect to an element may depend on a contact force experienced by the user's finger(s) contacting and moving with respect to an element, and this contact force may depend on the structure of the element that the finger(s) contact. In this regard, when a finger moves along the length of a projection or indention (indentation or perforation), the finger is opposed by a force. This force may differ from that opposing the finger in an instance in which the finger moves along the width of the projection/indention, rather, in an instance in which the finger moves across the length of the projection/indention.

Thus, for example, in the context of a region associated with a bidirectional vertical movement interaction, the touch-feedback interface may include a structure with one or more projections each of which has a length that extends along the respective vertical direction (e.g., up and down), and a width that extends across the respective vertical direction. In addition to or in lieu of projections, the touch-feedback interface may include indentations, perforations or the like (generally indentions).

FIGS. 14a, 14b, 14c and 14d (collectively FIG. 14) illustrate an example of a touch-feedback interface 72 for a region associated with a bidirectional vertical movement interaction in a first direction 74. The touch-feedback interface includes one or more elongated elements 76 (two being shown as elements 76a, 76b) the length of each of which extends along the first direction, and the width of each of which extends across the first direction. As more particularly shown in FIGS. 14b and 14c, the elongated elements may include, for example, elongated projections 78 and/or indentions 80.

FIGS. 15a, 15b, 15c and 15d (collectively FIG. 15) illustrate another example of a touch-feedback interface 82 for a region associated with a bidirectional vertical movement interaction in the first directions 74. In this example, the touch-feedback interface includes one or more elongated elements 84 (two being shown as elements 84a, 84b), each of which is formed of a set of smaller, similarly-shaped elements 86. Similar to the elements 76 of FIG. 14, the length of each element of FIG. 15 extends along the first direction, and the width of each element extends across the first direction. As more particularly shown in FIGS. 15b and 15c, the smaller elements may include, for example, semispherical or otherwise curved projections 88 and/or indentions 90.

In the embodiments of FIGS. 14 and 15, the user may have a different tactile or haptic perception dragging their finger(s) along the length of the elements in the first direction than along the width (across the length) of the elements across the first direction. By this, the touch-feedback interface may provide the user with an indication of the appropriate bidirectional vertical movement interaction for the respective region.

FIG. 16 illustrates yet another example of a touch-feedback interface 92 for a region associated with an omnidirectional movement interaction in a plane parallel to the visible representation of the regions 38, including any horizontal direction 94a and any vertical direction 94b. The touch-feedback interface includes a plurality of smaller, similarly-shaped elements 96 arranged in a matrix of the same or a similar number of elements along the horizontal direction (across the vertical direction), and along the vertical direction (across the horizontal direction). The elements may include, for example, semispherical or otherwise curved projections and/or indentions similar to the projections 88 and/or indentions 90 shown in FIGS. 15b and 15c. In the embodiment of FIG. 15, the user may have a similar tactile or haptic perception dragging their finger(s) in any direction; and accordingly, the touch-feedback interface may provide the user with an indication of the appropriate omnidirectional movement interaction for the respective region.

As also indicated above, for rate-varying functions, the number of fingers applied to carry out a movement 36 interaction may vary a rate at which a respective value changes. As an example, dragging one finger may indicate one velocity, and dragging two fingers may indicate another velocity. In such instances, the touch-feedback interface may include a plurality of elongated elements, each of which is associated with a velocity. The velocities associated with the elongated elements may be the same or similar such that dragging one finger may indicate a particular velocity, and dragging two or more fingers may indicate a multiple of the particular velocity. This is shown, for example in FIGS. 14a and 14d, and in FIGS. 15a and 15d. In another example, the velocities may be different such that dragging a finger over one of the elongated elements may indicate a particular velocity, and dragging a finger over another of the elongated elements may indicate another velocity.

According to one aspect of the present invention, all or a portion of the apparatus of exemplary embodiments of the present invention, generally operates under control of a computer program. The computer program for performing the methods of exemplary embodiments of the present invention may include one or more computer-readable program code portions, such as a series of computer instructions, embodied or otherwise stored in a computer-readable storage medium, such as the non-volatile storage medium.

It will be understood that each step of a method according to exemplary embodiments of the present invention, and combinations of steps in the method, may be implemented by computer program instructions. These computer program instructions may be loaded onto a computer or other programmable apparatus to produce a machine, such that the instructions which execute on the computer or other programmable apparatus create means for implementing the functions specified in the step(s) of the method. These computer program instructions may also be stored in a computer-readable memory that can direct a computer or other programmable apparatus to function in a particular manner, such that the instructions stored in the computer-readable memory produce an article of manufacture including instruction means which implement steps of the method. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing steps of the method.

Accordingly, exemplary embodiments of the present invention support combinations of means for performing the specified functions, combinations of steps for performing the specified functions and program instruction means for performing the specified functions. It will also be understood that each step or function, and combinations of steps or functions, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. It should therefore be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

APPENDIX A

Example XML Schema of a Configuration File

```
<Region title="Show Study List KB Command">
    <Rect>
        <Left>0</Left>
        <Top>0</Top>
        <Right>50</Right>
        <Bottom>50</Bottom>
    </Rect>
        <Gestures>
            <Gesture type="SinglePress">
                <Actions>
                    <Action type="Key">
                        <Key>F3</Key>
                    </Action>
                </Actions>
                <!--Override some defaults for SinglePress gesture in
                this region-->
                <ForceMinThreshold>300</ForceMinThreshold>
                <DurationMinThreshold>150</DurationMinThreshold>
            </Gesture>
            <Gesture type="TwoContactPress">
                <Actions>
                    <Action type="Key">
                        <!--F4 is the default shortcut key for folder
                        finder-->
                        <Key>F4</Key>
                    </Action>
                </Actions>
                <!--Override some defaults for gesture in this region-->
                <ForceMinThreshold>300</ForceMinThreshold>
                <DurationMinThreshold>50</DurationMinThreshold>
            </Gesture>
    </Gestures>
</Region>
<Region title="Cycle W/L Presets KB Command">
    <Rect>
        <Left>481</Left>
        <Top>251</Top>
        <Right>531</Right>
        <Bottom>299</Bottom>
    </Rect>
        <Gestures>
            <Gesture type="SinglePress">
                <Actions>
                    <Action type="KBCmd">
                        <Key>WLPresets</Key>
                    </Action>
                </Actions>
                <ForceMinThreshold>300</ForceMinThreshold>
                <DurationMinThreshold>50</DurationMinThreshold>
            </Gesture>
    </Gestures>
</Region>
<Region title="Mouse Control">
    <Rect>
        <Left>51</Left>
        <Top>0</Top>
        <Right>481</Right>
        <Bottom>199</Bottom>
    </Rect>
        <Gestures>
            <Gesture type="MouseMove">
                <Actions>
                    <Action type="MousePosChange">
                        <!--Parameters for this action are the delta
x & y from last contact poll-->
                    </Action>
                </Actions>
                <ForceMinThreshold>400</ForceMinThreshold>
                <ForceMaxThreshold>3999</ForceMaxThreshold>
            </Gesture>
            <Gesture type="MouseClickDrag">
                <Actions>
```

APPENDIX A-continued

Example XML Schema of a Configuration File

```
                <Action type="MouseLeftClickDrag">
                        <!--Parameters for this action are the delta
x & y from last contact poll-->
                </Action>
            </Actions>
            <ForceMinThreshold>4000</ForceMinThreshold>
        </Gesture>
        <Gesture type="InteractiveZoom">
            <Actions>
                <Action type="Zoom">
    <!--Parameters for this action are the delta distance between the two
fingers from last contact poll-->
                </Action>
            </Actions>
            <ForceMinThreshold>400</ForceMinThreshold>
            <ForceMaxThreshold>3999</ForceMaxThreshold>
        </Gesture>
        <Gesture type="InteractivePan">
            <Actions>
                <Action type="Pan">
                        <!--Parameters for this action are the delta
x & y from last contact poll-->
                </Action>
            </Actions>
            <ForceMinThreshold>400</ForceMinThreshold>
            <ForceMaxThreshold>3999</ForceMaxThreshold>
        </Gesture>
        <Gesture type="FiveContactPress">
            <Actions>
                <Action type="MouseRightClick">
                        <!--Activate Mouse Right Click Menu-->
                </Action>
            </Actions>
            <ForceMinThreshold>400</ForceMinThreshold>
        </Gesture>
    </Gestures>
</Region>
<Region title="Interactive Window-Level">
    <Rect>
        <Left>404</Left>
        <Top>200</Top>
        <Right>480</Right>
        <Bottom>299</Bottom>
    </Rect>
    <Gestures>
        <Gesture type="MouseMove">
            <Actions>
                <Action type="WindowLevel">
                        <!--Parameters for this action are the delta
x & y from last contact poll-->
                </Action>
            </Actions>
        </Gesture>
    </Gestures>
</Region>
```

What is claimed is:

1. An apparatus comprising:
a graphic overlay for a touch-sensitive surface with which an object comes into contact, the touch-sensitive surface being divided into a plurality of regions two or more of which are associated with distinct sets of one or more of the plurality of gestures, wherein the plurality of gestures are associated with a respective plurality of functions of a software application operable by a processor, wherein the graphic overlay visibly depicts the regions and a layout of the regions into which the touch-sensitive surface is divided;
a touch-feedback interface disposed on the graphic overlay within a region depicted by the graphic overlay, the touch-feedback interface comprising a structure shaped to provide touch feedback to a user at least prior to the user performing a gesture input within the region, the touch feedback indicative of the distinct set of one or more of the plurality of gestures associated with the respective region within which the touch-feedback interface is disposed,
wherein the gesture associated with the respective region within which the touch-feedback interface is disposed comprises a movement interaction defining bidirectional movement in a predetermined direction,
wherein the touch-feedback interface comprises one or more elongated elements the length of each of which extends along the predetermined direction, and the width of each of which extends across the predetermined direction, wherein the length is a longer dimension than the width, and the one or more elongated elements include one or more projections or indentions, and
wherein the touch-feedback interface is shaped to stimulate with a user a first tactile or haptic perception associated with the distinct set of one or more of the plurality of gestures associated with the respective region in instances in which the user drags the object over the touch-feedback interface along the length of the one or more elongated elements, and a second, different tactile or haptic perception associated with the distinct set of one or more of the plurality of gestures associated with the respective region in instances in which the user drags the object over the touch-feedback interface along the width of the one or more elongated elements.

2. The apparatus of claim 1, wherein the graphic overlay includes a set of one or more uniquely-placed contacts that, when the overlay is placed on the touch-sensitive surface, are detectable by the touch-sensitive surface and interpretable to correspond to the regions and the layout of the regions.

3. The apparatus of claim 1, wherein at least one of the one or more elongated elements is formed of a plurality of smaller, similarly-shaped elements, and wherein the smaller, similarly-shaped elements include projections or indentions.

4. The apparatus of claim 1, wherein the gesture associated with the respective region within which the touch-feedback interface is disposed comprises a movement interaction defining omnidirectional movement in any direction in a plane parallel to the graphic overlay, and
wherein the touch-feedback interface comprises a plurality of similarly-shaped elements arranged in a matrix of elements, wherein the similarly-shaped elements include projections or indentions, and
wherein the touch-feedback interface is shaped to stimulate with a user the same tactile or haptic perception in instances in which the user drags the object over the touch-feedback interface in any direction in the plane parallel to the graphic overlay.

5. The apparatus of claim 1, wherein the gesture associated with the respective region within which the touch-feedback interface is disposed comprises a movement interaction defining bidirectional movement in a predetermined direction, the function associated with the gesture comprising a rate-varying function, and
wherein the touch-feedback interface comprises a plurality of elongated elements each of which has an associated velocity with which the function is capable of being carried out.

6. The apparatus of claim 1, wherein the touch-feedback interface comprises a plurality of touch-feedback interfaces disposed on the graphic overlay within a respective plurality of regions depicted by the graphic overlay, the touch-feedback interfaces comprising structures shaped to provide touch feedback indicative of the distinct sets of gestures associated with the respective regions within which the touch-feedback interfaces are disposed, the gesture associated with at least one of the respective regions differing from the gesture associated with at least one other of the respective regions.

7. The apparatus of claim 1, wherein touch feedback associated with a first region of the two or more regions is indicative of a first set of distinct gestures for performing the gesture input using the first region, wherein touch feedback associated with a second region of the two or more regions is indicative of a second set of distinct gestures for performing the gesture input using the second region, wherein the first set of distinct gestures is different from the second set of distinct gestures, and wherein touch feedback provided by the first region is different than touch feedback provided by the second region.

8. An apparatus comprising:
a touch-sensitive surface with which an object comes into contact, the touch-sensitive surface being divided into a plurality of regions two or more of which are associated with distinct sets of one or more of a plurality of gestures, wherein the plurality of gestures are associated with a respective plurality of functions of a software application operable by a processor, wherein the touch-sensitive surface comprises a display configured to present an image visibly depicting the regions and a layout of the regions into which the touch-sensitive surface is divided;
a touch-feedback interface configured to interact with a region depicted by the display, the touch-feedback interface comprising circuitry configured to provide touch feedback to a user at least prior to the user performing a gesture input within the region, the touch feedback indicative of the distinct set of one or more of the plurality of gestures associated with the respective region with which touch-feedback interface is configured to interact,
wherein the gesture associated with the respective region within which the touch-feedback interface is disposed comprises a movement interaction defining bidirectional movement in a predetermined direction,
wherein the touch-feedback interface comprises one or more elongated elements the length of each of which extends along the predetermined direction, and the width of each of which extends across the predetermined direction, wherein the length is a longer dimension than the width, and the one or more elongated elements include one or more projections or indentions, and
wherein the touch-feedback interface is shaped to stimulate with a user a first tactile or haptic perception associated with an axis of the bidirectional movement in the predetermined direction in instances in which the user drags the object over the touch-feedback interface along the length of the one or more elongated elements, and a second, different tactile or haptic perception associated with the axis of the bidirectional movement in the predetermined direction in instances in which the user drags the object over the touch-feedback interface along the width of the one or more elongated elements.

9. The apparatus of claim 8, wherein the gesture associated with the respective region with which the touch-feedback interface is configured to interact comprises a movement interaction defining bidirectional movement in a predetermined direction, and
wherein the touch-feedback interface comprises circuitry configured to generate an electric field that stimulates with a user a first tactile or haptic perception in instances in which the user drags the object through the electric field along the predetermined direction, and a second, different tactile or haptic perception in instances in which the user drags the object through the electric field across the predetermined direction.

10. The apparatus of claim 8, wherein the gesture associated with the respective region within which the touch-feedback interface is configured to interact comprises a movement interaction defining omnidirectional movement in any direction in a plane parallel to the display, and
wherein the touch-feedback interface comprises circuitry configured to generate an electric field that stimulates with a user the same tactile or haptic perception in instances in which the user drags the object through the electric field in any direction in the plane parallel to the display.

11. The apparatus of claim 8, wherein the touch-feedback interface is configured to interact with a plurality of regions depicted by the display, and comprises circuitry configured to provide touch feedback indicative of a plurality of gestures associated with a respective plurality of regions with which the touch-feedback interface is configured to interact.

12. The apparatus of claim 8, wherein touch feedback provided by a first region of the two or more regions is indicative of a first set of distinct gestures for performing the gesture input using the first region, wherein touch feedback provided by a second region of the two or more regions is indicative of a second set of distinct gestures for performing the gesture input using the second region, wherein the first set of distinct gestures is different from the second set of distinct gestures, and wherein touch feedback provided by the first region is different than touch feedback provided by the second region.

* * * * *